W. O. KUHN.
LOCKING DEVICE FOR DIFFERENTIAL GEARS.
APPLICATION FILED JUNE 30, 1915.
1,173,442.
Patented Feb. 29, 1916.
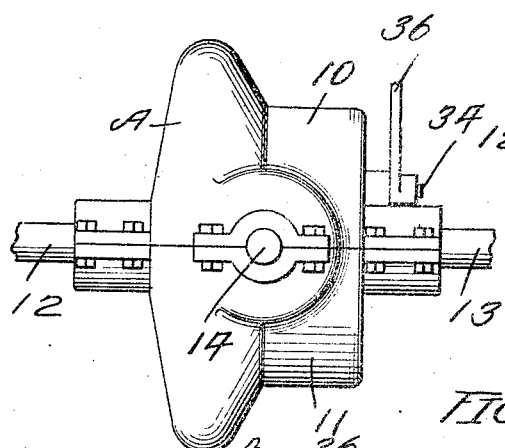
FIG. 1.
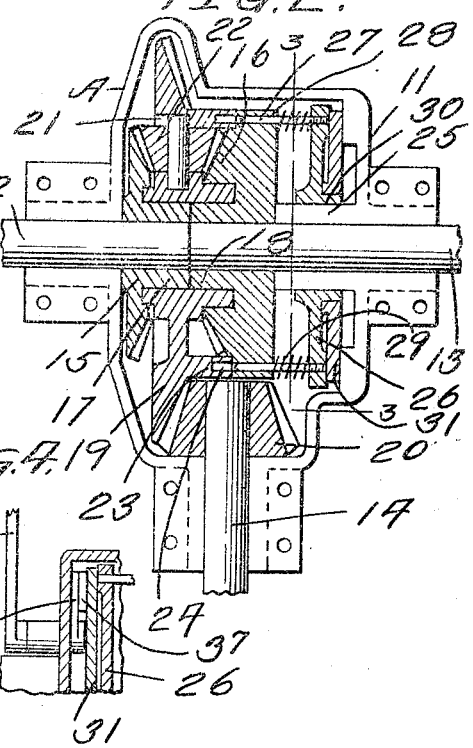
FIG. 2.
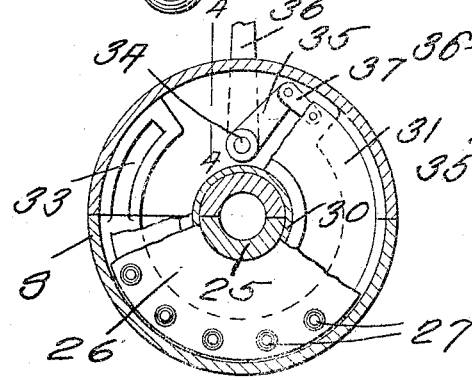
FIG. 3.
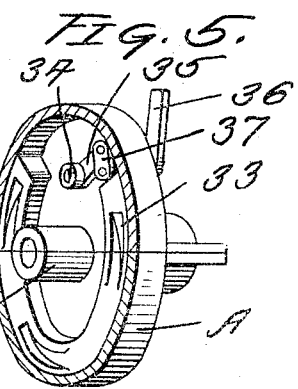
FIG. 4.
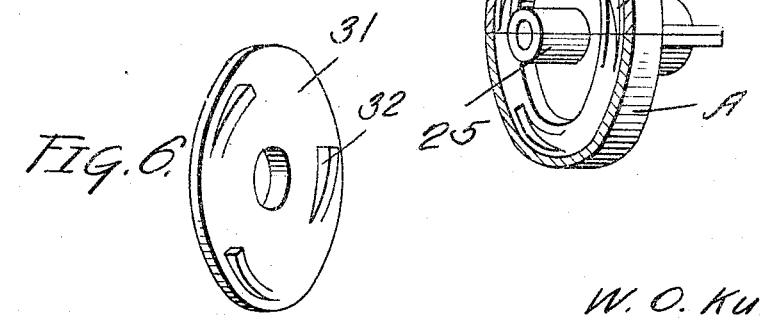
FIG. 5.
FIG. 6.
Witnesses
B. E. Brown
Henry T. Bright
Inventor
W. O. Kuhn
By Chandler & Chandler
Attorneys

UNITED STATES PATENT OFFICE.

WILLIAM O. KUHN, OF WEBER, WASHINGTON.

LOCKING DEVICE FOR DIFFERENTIAL GEARS.

1,173,442.  Specification of Letters Patent.  Patented Feb. 29, 1916.

Application filed June 30, 1915. Serial No. 37,357.

*To all whom it may concern:*

Be it known that I, WILLIAM O. KUHN, a citizen of the United States, residing at Weber, in the county of Grant, State of Washington, have invented certain new and useful Improvements in Locking Devices for Differential Gears; and I do hereby declare the following to be a full, clear, and exact description of the invention, such as will enable others skilled in the art to which it appertains to make and use the same.

This invention relates to locking devices for differential gears.

It is my purpose to provide a device of the character named embodying an improved construction whereby the differential action of the gearing may be neutralized whenever it is desired to drive the axle sections in unison, to prevent one axle section from spinning around loosely while the other is retarded in its turning.

It is my further purpose to provide a locking device for differential gears which will be simple in construction, efficient in action and easily controlled.

With the above and other purposes in view the invention consists in the details of construction and in the arrangement and combination of parts to be herei after more fully described and particularly pointed out in the appended claims.

In describing the invention in detail reference will be had to the accompanying drawings wherein like characters of reference denote corresponding parts in the several views, and in which—

Figure 1 is a view in elevation of a differential gear embodying the improved construction; Fig. 2, a vertical section of what is shown in Fig. 1; Fig. 3, a section on the line 3—3 of Fig. 2; Fig. 4, a section on the line 4—4 of Fig. 3; Fig. 5, a perspective view looking at the inner wall of the differential casing which is provided with the wedge grooves, and Fig. 6, a perspective view of the wedge disk of the lock.

Referring to the drawings A indicates the differential casing which for convenience in assembling the parts contained therein is formed of sections 10 and 11. Rotatably mounted in the casing A are the inner ends of axle sections 12 and 13 and also rotatably mounted in the casing A is one end of a drive shaft 14. Splined upon the adjacent ends of the axle sections 12 and 13 are beveled gears 15 and 16. These gears 15 and 16 have the adjacent ends of their hub portions extended as at 17 and 18 respectively and rotatably mounted on these extended hub portions between the gears 15 and 16 is a beveled gear 19 which meshes with a beveled gear 20 fixed on the drive shaft 14. The gear 19 is provided with a plurality of openings 21 and rotatably mounted in each of the openings 21 is a beveled pinion 22 which meshes with the beveled gears 15 and 16. The gear 19 is provided with a concentric flange 23 directed toward the gear 16 and provided with a plurality of recesses 24. The bearing of the axle section 13 is extended as at 25 and rotatably mounted on this extended portion of said bearing is a disk 26, said disk being also slidable on said bearing extension. Fixed to the disk 26 are a plurality of locking pins 27, slidably engaged in passages 28 formed in the gear 16. The number of passages 28 and locking pins 27 corresponds to the number of recesses 24 in the flange 23. Encircling each locking pin 27 is a spiral spring 29 one end of which bears against the disk 26 and the other end against the gear 16. These springs 29 normally hold the disk 26 at the limit of its movement away from the gear 16 and therefore normally hold the locking pins 27 out of the recesses 24.

In order to move the disk 26 toward the gear 16 and the locking pins 27 into the recesses 24 for the purpose of locking the gears 16 and 19 together and driving the axle sections 12 and 13 in unison the following construction is provided. The hub of the disk 26 is extended as at 30 and rotatably mounted on this hub extension is a disk 31 which has formed on the face thereof adjacent the casing a plurality of wedge lugs 32 which normally seat respectively in corresponding wedge recesses 33 formed in the casing A. Rotatably mounted in the casing A is a shaft 34 which has fixed on the inner end thereof an arm 35 and on its outer end a lever 36 adapted to be operatively connected in any suitable manner to another operating lever (not shown) disposed convenient to the driver of a motor vehicle. The free end of the arm 35 is connected to the disk 31 by means of a link 37.

Under normal conditions the wedge lugs 32 are seated in the groove 33 and the pins 27 are disposed out of the recesses 24. If it is desired to lock the axle sections to drive same in unison it is only necessary to rotate the shaft 34 through the medium of the leve. 26. Such rotation of the shaft 34 will rotate the disk 31 and move the lugs 32 out of the recesses 33. As the lugs 32 move out of the recesses 33 the disks 31 and 26 will be moved toward the gear 16 and the pins 27 will be moved into the recesses 24 and thus lock the gear 16 to the gear 19. Under these conditions the axle sections 12 and 13 will be driven in unison at all times. By rotating the shaft 34 in the opposite direction the lugs 32 will be again seated in the recesses 33 and the pins 27 withdrawn from the recesses 24 by the springs 29 as will be apparent.

What is claimed is:—

1. The combination with the sectional axle of a vehicle, and a differential gearing for driving the axle section, of locking pins slidably mounted in one of the members of the gearing and engageable with another member to lock said members together, means normally holding said locking pins out of locking engagement with the second named member, a rotatable shaft, and means interposed between said shaft and pins and operable by the rotation of the shaft to move the pins into engagement with the second member.

2. The combination with the sectional axle of a vehicle, and a differential gearing including an inclosing casing, of locking pins slidably mounted in one of the members of the gearing and engageable with another member to lock said members together, a disk rotatably and slidably mounted within the casing and fixedly secured to said locking pins, a second disk mounted to rotate independently of the first disk and to slide in unison with the latter, means normally holding said disks in position to dispose the locking pin out of engagement with the second named member, lugs on the second disk normally engaged in recesses in the wall of the casing, and means for rotating the second disk whereby the coaction of said lugs with the wall of the casing will move both of the disks bodily in a direction to engage the locking pins with the second named member of the gearing.

In testimony whereof, I affix my signature, in the presence of two witnesses.

WILLIAM O. KUHN.

Witnesses:
 FRANK J. KOLMAN,
 C. TOUSEY TAYLOR.